United States Patent [19]
Erickson, Jr. et al.

[11] Patent Number: 5,394,296
[45] Date of Patent: Feb. 28, 1995

[54] MODULAR POWER SOURCE MONITORING AND CONTROL SYSTEM

[75] Inventors: Irvin B. Erickson, Jr., Wake Forest; Richard D. Werner, Mebane, both of N.C.

[73] Assignee: General Electric Company, New York, N.Y.

[21] Appl. No.: 143,226

[22] Filed: Oct. 29, 1993

[51] Int. Cl.6 .............................................. H02B 1/00
[52] U.S. Cl. ................... 361/659; 361/614; 361/624; 361/641; 361/637
[58] Field of Search ............... 361/609, 611, 614, 622, 361/624, 627–631, 634, 636–637, 644–648, 659–671, 673, 678

[56] References Cited
U.S. PATENT DOCUMENTS

| | | | |
|---|---|---|---|
| 4,752,233 | 6/1988 | Morby et al. | 439/212 |
| 4,819,129 | 4/1989 | Erickson | 361/646 |
| 4,945,650 | 7/1990 | Sabatella et al. | 361/609 |
| 5,172,300 | 12/1992 | Morby et al. | 361/355 |

Primary Examiner—Gregory D. Thompson
Attorney, Agent, or Firm—Richard A. Menelly

[57] ABSTRACT

A modular power source monitoring and control system is mounted within a common power panel enclosure and includes a main lug assembly and a metering, relaying and control assembly. The main lug assembly includes a mounting and power connecting arrangement and a connector lug arrangement. The metering, relaying and control assembly includes a mounting and power connecting means and an electrical circuit for metering and controlling a power source. For both assemblies, the mounting and power connecting arrangement is in the form of a base member having a pair of mounting brackets on either side and conductor stabs extending from the bottom.

8 Claims, 3 Drawing Sheets

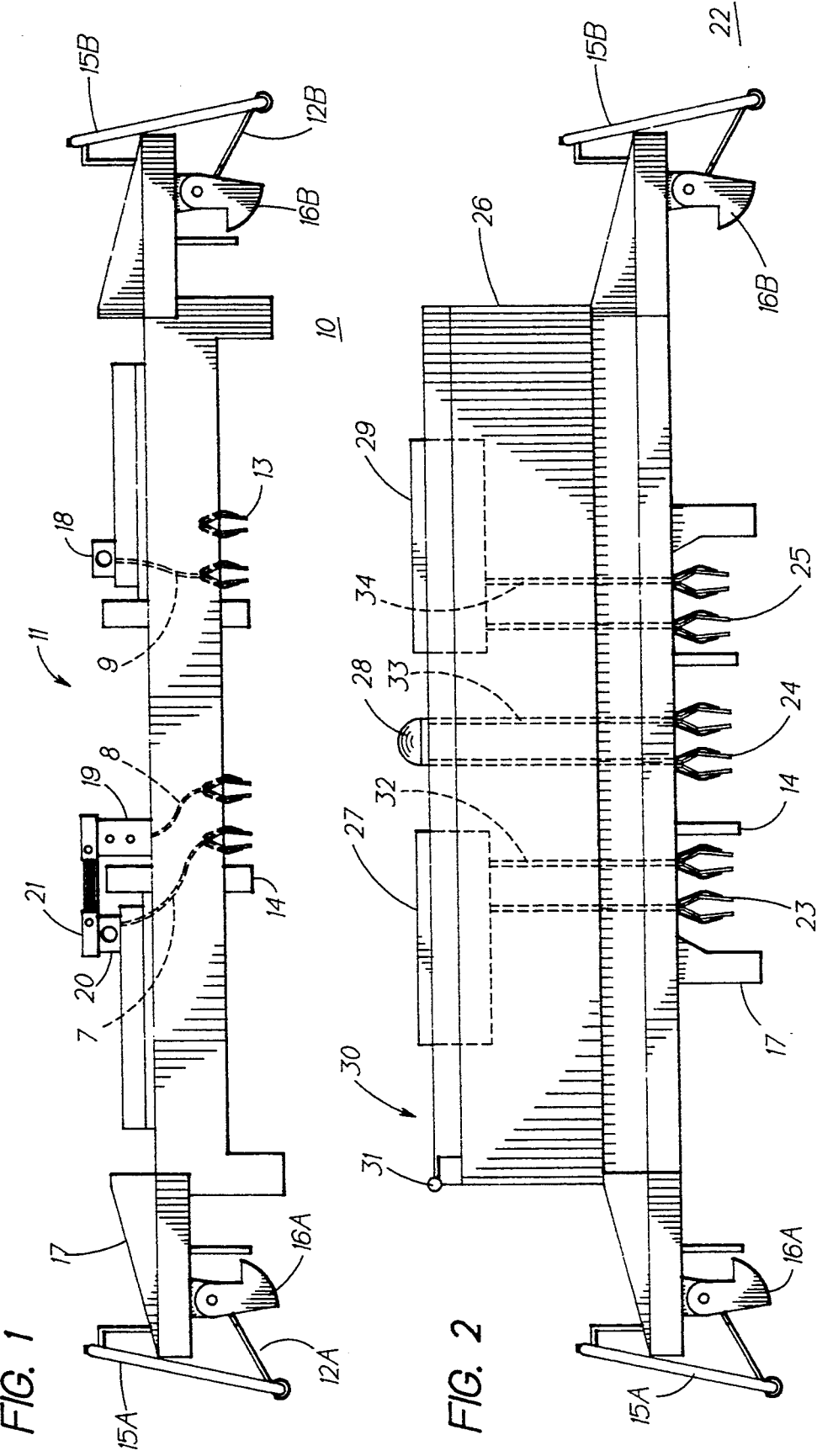

MODULAR POWER SOURCE MONITORING AND CONTROL SYSTEM

BACKGROUND OF THE PREFERRED EMBODIMENT

The present invention relates to modular plug-in electrical devices for metering, relaying and controlling an electrical power source.

The monitoring and controlling of a power source and support wiring is vital to the integrity of an electrical subsystem. In civilian transportation control systems, such as air traffic controllers, backup and monitoring systems sources are necessary to prevent system failure which could result in the catastrophic loss of life. To protect against system failure, the main power sources are typically backed up by local DC power sources. During operation, the backup DC power sources are monitored to ensure system reliability as well as to allow metering. The DC power storage cells include a "floating" voltage to indicate an excessively low or high voltage which could represent a problem in the local power storage charging unit as well as positive and negative pole grounding.

Such monitoring and control equipment is usually "hard-wired" to the power sources and associated wiring which incurs a large cost and limits the portability of the equipment. Accordingly, it would be desirable to employ a low-cost removable unit for the monitoring and control of the power source.

An effective modular device for connecting circuit breakers and disconnect switches to a common power panel enclosure is described in U.S. Pat. No. 4,752,233 to Morby et al. entitled "Electric Power Panelboard Adapter Module". The adapter module includes a plastic base member through which multiple contact stabs extend for plugging onto individual bus bars of a multiphase power system. The opposite ends of the stabs connect with the line terminals of circuit breakers and disconnect switches.

One purpose of the invention is to adapt a circuit breaker and disconnect switch adapter module to allow the removable interconnection of power control and monitoring equipment.

SUMMARY OF THE INVENTION

In accordance with the invention, the power source modular metering, relaying and control equipment includes a main lug assembly and a metering, relaying and control assembly. The main lug assembly may be mounted within common panelboard or switchboard and is connected to the incoming main power system. A shunt is connected to the main lug assembly to provide a predetermined fraction of power for metering purposes. The lug assembly may be mounted within the panelboard or switchboard and includes a mounting and power connecting means and a connector lug arrangement. The mounting and power connecting arrangement comprises a base having a pair of mounting brackets and several stab connectors. The mounting brackets engage a pair of mounting rails disposed within the panelboard or switchboard. The stab connectors engage the power system bus bars for delivering power to the metering, relay and control assembly.

The metering, relaying and control assembly may be used with AC or DC systems to perform a plurality of functions in connection with the monitoring and control of a power source and associated circuitry. In a preferred embodiment, the control assembly includes a mounting and power connecting arrangement and an electrical circuit for metering and controlling the power source. An electrical component housing is mounted to a base and includes a cover whereon electric meters and fault indicators may be mounted. The electrical circuit includes first and second relay units disposed within the housing and in circuit with the meters to control local and remote fault indicators.

The present invention provides a low-cost, modular device for monitoring and controlling a power source which is removably installed at a job site.

BRIEF DESCRIPTION OF THE DRAWINGS

FIG. 1 is a side view of a main lug and shunt assembly in accordance with the present invention;

FIG. 2 is a side view of a modular metering, relaying and control assembly in accordance with the present invention;

DESCRIPTION OF THE PREFERRED EMBODIMENT

Figure 3:
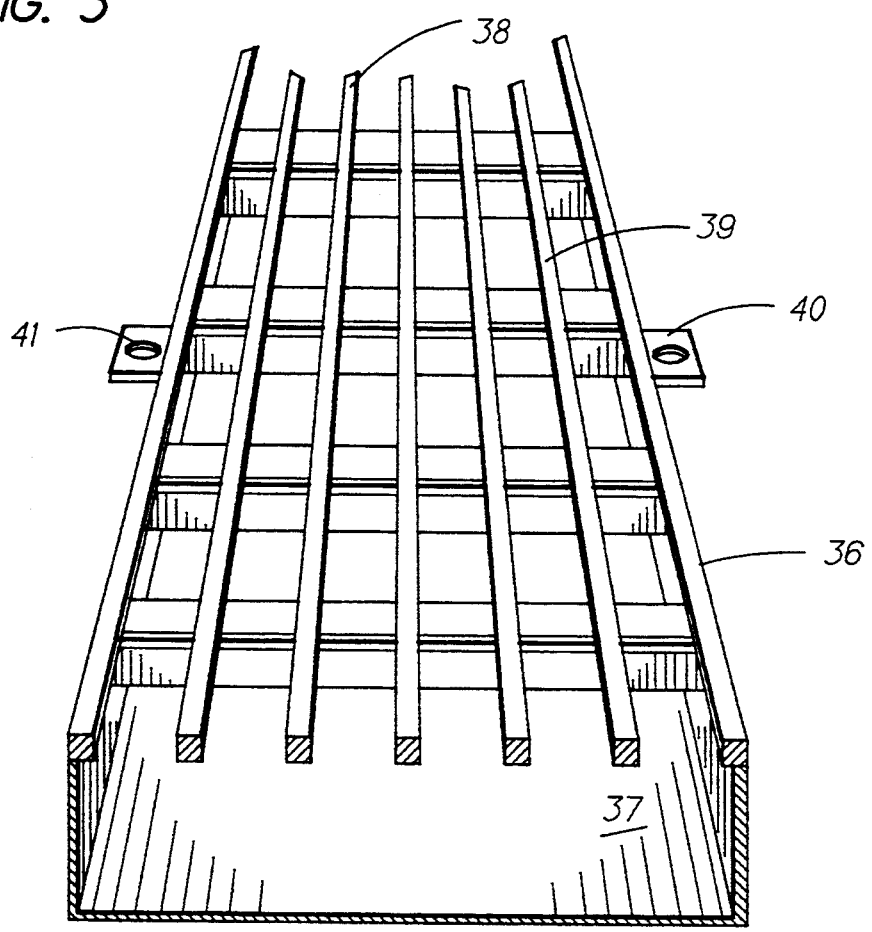
FIG. 3 is a top perspective view of a bus bar rack whereon the assemblies of FIG. 1 and 2 are mounted.

The main lug and shunt assembly 10 within the power monitoring and control equipment is shown in FIG. 1 and includes a main lug support 11 on a top part with mounting means 12A, 12B arranged on opposite sides. As described in aforementioned U.S. Pat. No. 4,752,233 electrical stabs 13 extend from the bottom for connection with the electric distribution bus bars and are electrically isolated from each other by means of insulation shields 14. The handles 15A, 15B on the top of the mounting means engage with corresponding locking latches 16A, 16B for manually attaching to the electrical power distribution bus bars. The insulative support base 17 supports the main lugs, one of which is depicted at 18 and a pair of connector lugs 19, 20 which are interconnected by means of the shunt 21. The main lugs receive main incoming power and supplies a fraction of the incoming power through the shunt for metering purposes. The connector lugs and main lugs connect with the associated stabs 13 by means of wire conductors 7, 8, and 9.

The modular metering, relaying and control assembly within the power monitoring and control equipment is shown at 22 in FIG. 2. A similar insulative support 17 is attached to a metallic enclosure 26 to allow removable connection with the power system bus bars by means of handles 15A,15B and locking latches 16A, 16B. A top cover 30 is attached to the enclosure by means of the hinge 31 and a voltmeter 27, fault indicating lamp 28 and amp meter 29 all extend through the top cover and electrically connect with the stabs 23, 24, 25 by means of corresponding wire conductors 32, 33, 34. Insulating shields 14 electrically isolate the separate stabs in the same manner as described earlier. An electromagnet relay can optionally be connected within the assembly when such relay function is desired.

When the main lug and shunt assembly of FIG. 1 and the modular metering, relaying and control assembly of FIG. 2 are arranged within a common switchboard of panelboard, the resulting monitoring and control assembly provides a wide range of monitoring and control functions.

A typical panelboard-switchboard interior is depicted at 35 in FIG. 3 and is similar to that described in U.S. Pat. No. 5,172,300 entitled "Electric Power Distribution Panelboard-Switchboard Assembly". Mounting rails 36 extend along the sides of the interior with a mounting bar 40 extending across the mounting rails. The insulative supports that carry the main lug assembly and the metering, relaying and control assembly attach to the mounting rails by means of the apertures 41 formed within the opposite ends of the mounting bar. The bus bar support rails 37 extend inboard the mounting rails to provide support to the bus bars 38 and interconnect with the bus bars by means of the insulating support tubes 39.

Figure 4:
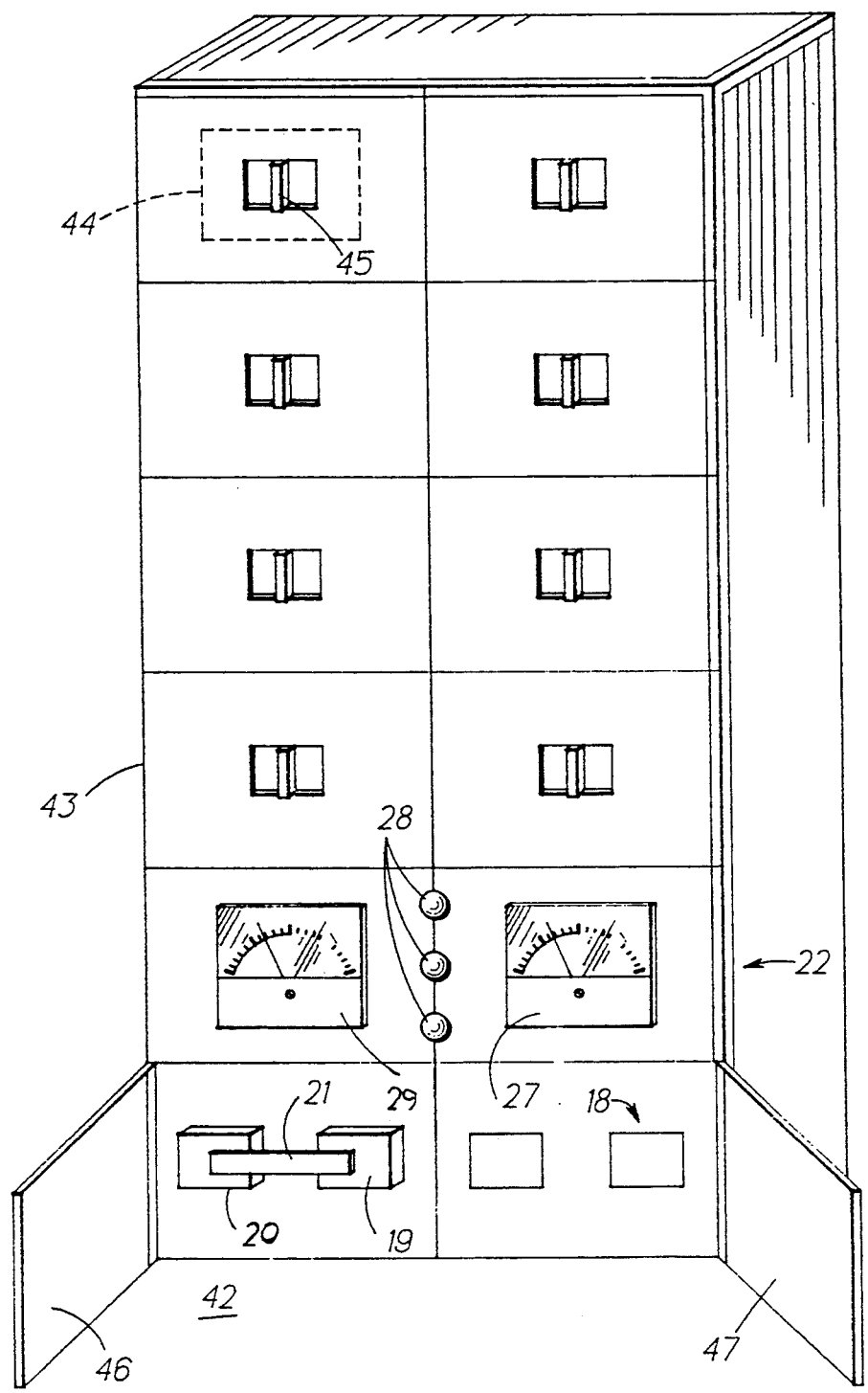
FIG. 4 is a front perspective view of a panelboard containing the main lug and shunt assembly of FIG. 1 and the modular metering, relaying and control assembly of FIG. 2

FIG. 4 depicts a panelboard 42 that also serves as a power monitoring and control assembly. The panelboard includes a metal enclosure 43 housing a plurality of circuit breakers 44 that are externally-accessible by means of the operating handles 45. The provision of the modular metering, relay and control assembly 22 allows the voltage and current through the panelboard to be monitored and controlled. The voltmeter 27 and amp meter 29 allows the voltage and current values to be observed on a continual basis. The indicator lamps 28 provide visual indication as to which one of the circuit breakers has responded to open the associated electric circuit within the panelboard. The main lugs 18 are mounted within the panelboard enclosure and are accessed by means of doors 46, 47. The shunt 21 and connector lugs 19, 20 are also located behind the doors to prevent inadvertent contact with these components when the panelboard is electrically-energized.

An arrangement for providing power monitoring and control function to panelboards and switchboards by the addition of a modular metering, relaying and control assembly and a main lug and shunt assembly. Both of the assemblies are removable and interchangeable with little effort.

We claim:

1. A modular electric power monitoring and control system comprising:

An electric switch and circuit breaker enclosure 43 having a plurality of electric bus bars 38 arranged intermediate bus bar support rails 37 within said enclosure, said bus bars arranged for electric connection with an electrical distribution power system;

a plurality of electric switches or circuit breakers 44 mounted within said enclosure and electrically connected with said bus bars; and an electric meter assembly 22 mounted within said enclosure, said electric meter assembly including a housing 26 having a top part 30 receiving an electric meter, 27, 29 a bottom part 23, 24, 25 electrically connecting said meter with said bus bars, and a support 17 with releasable means 16A, 16B on opposite sides of said support for releasably mounting said support and said housing to said bus bar support rails.

2. A modular electric power monitoring and control system comprising:

An electric switch and circuit breaker enclosure 43 having a plurality of electric bus bars 38 arranged intermediate bus bar support rails 37 within said enclosure, said bus bars arranged for electric connection with an electrical distribution power system;

a main lug assembly 11 mounted within said enclosure, said main lug assembly including a support base 17 having a top part 11 receiving a main electric lug connector 18, a bottom part 13 electrically connecting said main lug with said bus bars, and releasable means 16A, 16B on opposite sides of said support base for releasably mounting said support base to bus bar support rails.

3. A modular electric power monitoring and control system comprising:

An electric switch and circuit breaker enclosure 43 having a plurality of electric bus bars 38 arranged intermediate bus bar support rails 37 within said enclosure, said bus bars arranged for electric connection with an electrical distribution power system;

a support base 17 having a top part 11 receiving a main electric lug connector 18, a bottom part 13 electrically connecting said main lug with said bus bars, and releasable means 16A, 16B on opposite sides of said support base for releasably mounting said support base to bus bar support rails; and an electric current shunt 21 on said support base top part and electrically connecting with said bus bars by means of said bottom part.

4. The system of claim 1 wherein said support rails include at least one aperture disposed therethrough.

5. The system of claim 4 wherein said releasable means include a rotatable latch positioned to engage said aperture through said mounting rails.

6. The system of claim 5 further including a manually operable handle extending from said latch.

7. The system of claim 1 including contact stabs extending from said bottom part for electrically connecting said meters with said bus bars.

8. A main lug assembly 10 adapted for mounting within a circuit breaker or switch enclosure, 43 said main lug assembly including a support base 17 having a top part receiving main electric lug connector 18, a bottom part 13 electrically connecting said main lug with bus bars within a circuit breaker or switch enclosure 43, and releasable means 16A, 16B on opposite sides of said base for releasably mounting said support base to bus bar support rails; and an electric current shunt 21 on said top part connecting with bus bars within said circuit breaker or switch enclosure.

* * * * *